United States Patent
Leong et al.

(10) Patent No.: US 11,295,366 B2
(45) Date of Patent: Apr. 5, 2022

(54) MATCHING CUSTOMER AND PRODUCT BEHAVIORAL TRAITS

(71) Applicant: International Business Machines Corporation, Armonk, NY (US)

(72) Inventors: Alan M. E. Leong, North York (CA); Shaun N. Maharaj, Scarborough (CA); Parnit Pooni, Mississauga (CA); Chi Kam P. Yau, Markham (CA)

(73) Assignee: International Business Machines Corporation, Armonk, NY (US)

( * ) Notice: Subject to any disclaimer, the term of this patent is extended or adjusted under 35 U.S.C. 154(b) by 434 days.

(21) Appl. No.: 16/547,636

(22) Filed: Aug. 22, 2019

(65) Prior Publication Data

US 2019/0378197 A1    Dec. 12, 2019

Related U.S. Application Data

(63) Continuation of application No. 15/014,324, filed on Feb. 3, 2016, now abandoned.

(51) Int. Cl.
*G06Q 30/00* (2012.01)
*G06Q 30/06* (2012.01)
(Continued)

(52) U.S. Cl.
CPC ......... *G06Q 30/0631* (2013.01); *G06F 16/24* (2019.01); *G06Q 50/01* (2013.01)

(58) Field of Classification Search
CPC ..................................................... G06Q 30/00
See application file for complete search history.

(56) References Cited

U.S. PATENT DOCUMENTS

| 8,612,306 B1 | 12/2013 | Mukherjee |
| 8,788,307 B2 | 7/2014 | Wright |

(Continued)

FOREIGN PATENT DOCUMENTS

| EP | 1146457 A3 | 3/2002 |
| WO | 0051050 A1 | 7/2002 |
| WO | 2008153625 A2 | 3/2009 |

OTHER PUBLICATIONS

Silverman, Barry, "Do what I mean: Online Shopping with Natural Language Search Agent", Penn Libraries, dated Jul. 2001. (Year: 2001).*

(Continued)

*Primary Examiner* — Mark A Fadok
(74) *Attorney, Agent, or Firm* — Christopher M. Pignato (57) ABSTRACT

At least one detail for at least one product in a group of products is received. At least one input for at least one customer in a group of customers is received. At least one detail for at least one product and at least one input for at least one customer is stored to a database repository. Product traits for at least one product are generated and stored to a database repository. Customer traits for at least one customer are generated and stored to a database repository. The generation of customer traits is independent from the generation of product traits. At least one recommendation for matching at least one product to at least one customer is generated. The at least one recommendation is based on the generated traits of the at least one product and the generated traits of the at least one customer.

18 Claims, 2 Drawing Sheets

(51) Int. Cl.
    *G06F 16/24*     (2019.01)
    *G06Q 50/00*     (2012.01)

(56) References Cited

U.S. PATENT DOCUMENTS

| | | |
|---|---|---|
| 9,612,306 B2 | 4/2017 | Lin |
| 9,710,483 B1 | 7/2017 | Miller |
| 9,836,533 B1 | 12/2017 | Levi |
| 2003/0074253 A1 | 4/2003 | Scheuring |
| 2007/0124284 A1 | 5/2007 | Lin |
| 2009/0271293 A1 | 10/2009 | Parkhurst |
| 2013/0060604 A1 | 3/2013 | Wright |
| 2014/0032452 A1 | 1/2014 | Perkowitz |
| 2014/0188594 A1 | 7/2014 | Kritt |
| 2014/0195303 A1 | 7/2014 | Jarrett |
| 2014/0244361 A1 | 8/2014 | Zhang |
| 2014/0257990 A1 | 9/2014 | Cudgma |
| 2014/0337101 A1 | 11/2014 | Spears |
| 2015/0242707 A1 | 8/2015 | Wilf |
| 2015/0281445 A1 | 10/2015 | Kumar |
| 2015/0286829 A1 | 10/2015 | Amacker |
| 2015/0310112 A1 | 10/2015 | Allen |
| 2015/0358416 A1 | 12/2015 | Gariepy |
| 2016/0019621 A1 | 1/2016 | Jnagal |
| 2016/0057499 A1 | 2/2016 | Foerster |
| 2016/0119377 A1 | 4/2016 | Goldberg |
| 2016/0170938 A1 | 6/2016 | Allen |
| 2016/0170956 A1 | 6/2016 | Allen |
| 2016/0170968 A1 | 6/2016 | Allen |
| 2016/0170969 A1 | 6/2016 | Allen |
| 2016/0180438 A1 | 6/2016 | Boston |
| 2016/0196313 A1 | 7/2016 | Allen |
| 2016/0350667 A1 | 12/2016 | Novotny |
| 2017/0017838 A1 | 1/2017 | Biswas |
| 2017/0053186 A1 | 2/2017 | Allen |
| 2017/0060982 A1 | 3/2017 | Akkiraju |
| 2017/0061448 A1 | 3/2017 | Akkiraju |
| 2017/0061497 A1 | 3/2017 | Akkiraju |
| 2017/0206095 A1 | 7/2017 | Gibbs |
| 2017/0221125 A1 | 8/2017 | Leong |
| 2017/0221126 A1 | 8/2017 | Leong |
| 2018/0192108 A1* | 7/2018 | Lyons .................. G11B 27/031 |

OTHER PUBLICATIONS

Bosnjak et al., "Personality determinants of online shopping: Explaining online purchase intentions using a hierarchical approach", Journal of Business Research, vol. 60, Issue 6, Jun. 2007, © 2007 Elsevier, pp. 597-505.

Di Rienzo et al., "Recommendations with Personality Traits Extracted from Text Reviews", Researchgate.net, dated Oct. 2015. (Year: 2015).

Ho et al., "Personalization and choice behavior: the role of personality traits", The Data Base for Advances in nformation Systems, vol. 39, Issue 4, Nov. 2008, pp. 31-47.

Insights for Webmasters, Developers, Facebook, Printed on Nov. 11, 2015, 12:48 PM, 3 pages, <https://developers.acebook.com/docs/platforminsights/domains>.

Jahng et al., "Personality traits and effectiveness of presentation of product information in e-business systems",: European Journal of Information Systems, vol. 11, No. 3, Sep. 2002, pp. 181-195(15).

Nunes et al., "Improving Recommendations by Using Personality Traits in User Profiles", International Conferences Jn Knowledge Management and New Media Technology, Sep. 2008, Graz, Austria, pp. 92-100.

Appendix P—List of IBM Patents or Patent Applications Treated as Related, Filed herewith, 2 Pages.

* cited by examiner

MATCHING CUSTOMER AND PRODUCT BEHAVIORAL TRAITS

BACKGROUND OF THE INVENTION

The present invention relates generally to the field of electronic commerce (or E-commerce), and more particularly to generating traits and matching customers to products.

E-commerce is the trading or facilitation of trading in products or services using computer networks, such as the Internet. E-commerce draws on technologies such as mobile commerce, electronic funds transfer, supply chain management, Internet marketing, online transaction processing, electronic data interchange (EDI), inventory management systems, and automated data collection systems. Modern electronic commerce typically uses the World Wide Web (W3) for at least one part of the transaction's life cycle, although it may also use other technologies such as e-mail. E-commerce businesses may employ at least one of the following: on-line shopping web sites for retail sales direct to consumers, providing or participating in online marketplaces which process third-party business-to-consumer or consumer-to-consumer sales, business-to-business buying and selling, gathering and using demographic data through web contacts and social media, business-to-business electronic data interchange, marketing to prospective and established customers by e-mail or fax (for example, with newsletters), and engaging in pre-retail for launching new products and services.

SUMMARY

Embodiments of the present invention include a method, computer program product, and system for generating traits and matching customers to products. In one embodiment, at least one detail for at least one product in a group of products is received. At least one input for at least one customer in a group of customers is received. At least one detail for at least one product and at least one input for at least one customer is stored to a database repository. Product traits for at least one product are generated and stored to a database repository. Customer traits for at least one customer are generated and stored to a database repository. The generation of customer traits is independent from the generation of product traits. At least one recommendation for matching at least one product to at least one customer is generated. The at least one recommendation is based on the generated traits of the at least one product and the generated traits of the at least one customer.

DETAILED DESCRIPTION

Some embodiments of the present invention recognize that marketing products to customers may be a manual process done by a catalog manager who segments customers and then determines how the segments relate to the product catalog. Stated another way, the catalog manager may decide that males, fifteen to twenty years old, may be interested in sports equipment more so than fifty to fifty-five year old females. Using the various customer segments, the catalog manager determines how to market the products in the catalog.

Embodiments of the present invention recognize that there may be a method, computer program product, and computer system for generating traits and matching customers to products. The method, computer program product and computer system may allow for automated, and a more personal, mapping of customer segments to the products in a catalog by using Natural Language Processing (NLP) to generate traits based on customer segment information and catalog/product data. Personality traits for customers may be generated by making use of NLP and other programs to perform linguistic analysis and infer personality traits from written text. For example, one method using NLP may leverage traditional approaches such as using a Linguistic Inquiry and Word Count (LIWC) psycholinguistic dictionary to find psychologically meaningful word categories while improving upon them. In other words, the method may identify words that are associated with psychologically-relevant categories.

Figure 1:
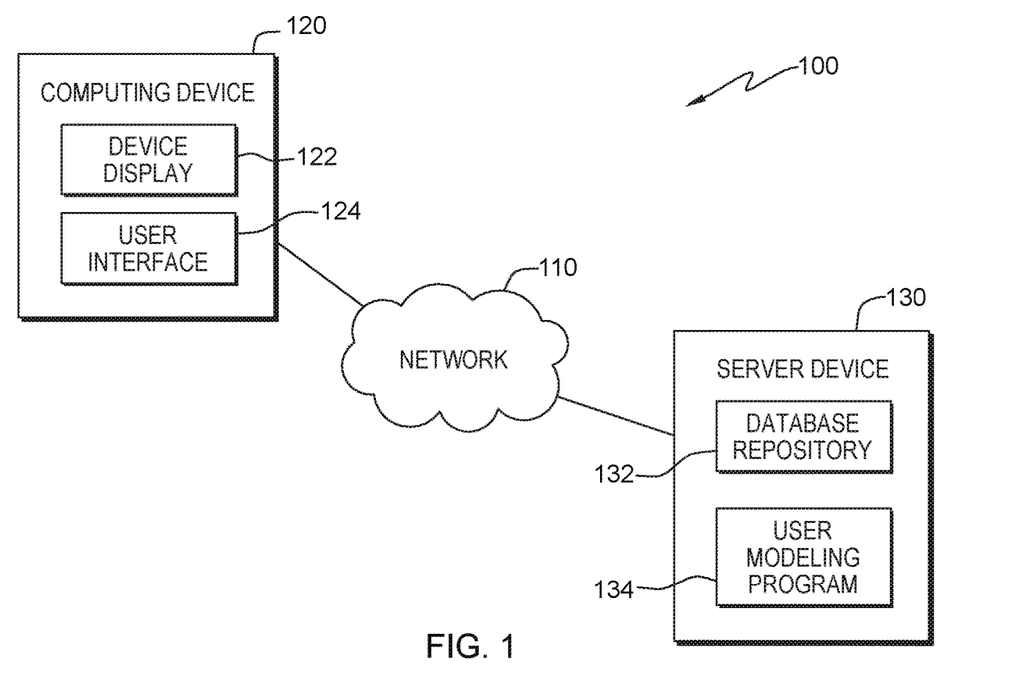
FIG. 1 is a functional block diagram of a computing environment, in accordance with an embodiment of the present invention.

FIG. 1 is a functional block diagram of a computing environment, generally designated 100, in accordance with an embodiment of the present invention. FIG. 1 provides only an illustration of one implementation and does not imply any limitations with regard to the environments in which different embodiments may be implemented. Those skilled in the art may make many modifications to the depicted environment without departing from the scope of the invention as recited by the claims.

An embodiment of computing environment 100 includes computing device 120 which includes device display 122 and user interface 124. Computing environment 100 also includes server device 130 which includes database repository 132 and user modeling program 134. Computing device 120 and server device 130 are interconnected via network 110. In example embodiments, computing environment 100 may include other computing devices not shown such as smartwatches, cell phones, smartphones, phablets, tablet computers, laptop computers, desktop computers, other computer servers or any other computer system known in the art, interconnected with computing device 120 and server device 130 over network 110.

In example embodiments, computing device 120 and server device 130 may connect to network 110 which enables computing device 120 to access other computing devices and/or data not directly stored on computing device 120. Network 110 may be a local area network (LAN), a telecommunications network, a wide area network (WAN) such as the Internet, or any combination of the three, and include wired, wireless or fiber optic connections. Network 110 may include one or more wired and/or wireless networks that are capable of receiving and transmitting data, voice, and/or video signals, including multimedia signals that include voice, data, and video information. In general, network 110 may be any combination of connections and protocols that will support communications between computing device 120, server device 130, and other computing devices (not shown) within computing environment 100, in accordance with embodiments of the present invention.

In embodiments of the present invention, computing device 120 may be a laptop, tablet, or netbook personal computer (PC), a desktop computer, a personal digital assistant (PDA), a smartphone, or any other hand-held, programmable electronic device capable of communicating with any computing device within computing environment 100. In certain embodiments, computing device 120 represents a computer system utilizing clustered computers and components (e.g., database server computers, application server computers, etc.) that act as a single pool of seamless resources when accessed by elements of computing environment 100. In general, computing device 120 is representative of any electronic device or combination of electronic devices capable of executing computer readable program instructions. Computing environment 100 may include any number of computing device 120. Computing device 120 may include components as depicted and described in further detail with respect to FIG. 3, in accordance with embodiments of the present invention. Server device 130 is substantially similar to computing device 120.

In an embodiment, device display 122 may be an electronic visual display for a desktop computer, laptop computer, tablet computer, smartphone, smart-watch, etc. A display may include a touchscreen which is an input device layered on top of the display for allowing a user to control an electronic device via simple or multi-touch gestures by touching the display with a special stylus and/or one or more fingers. The display device in modern monitors is typically a thin film transistor liquid crystal display (TFT-LCD) or a flat panel LED (light emitting diode) display, while older monitors used cathode ray tubes (CRT). It may be connected to the computer via VGA (video graphics array), DVI (digital video interface), HDMI (High Definition Multi-Media Interface), DisplayPort, Thunderbolt, LVDS (Low-Voltage Differential Signaling) or other proprietary connectors and signals. Originally, computer monitors were used for data processing. From the 1980s onwards, computers (and their monitors) have been used for both data processing and entertainment. The common aspect ratio of computer monitors has changed from "four to three" to "sixteen to nine" resulting in more of a wide-screen display.

In an embodiment, user interface 124 provides an interface between a user of computing device 120, network 110 and any other devices connected to network 110. User interface 124 allows a user of computing device 120 to interact with the W3 and also enables the user to receive an indicator of one or more previous viewing locations and a summary of viewing history. In general, a user interface is the space where interactions between humans and machines occur. User interface 124 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. User interface 124 may also be mobile application software that provides an interface between a user of computing device 120 and network 110. Mobile application software, or an "app," is a computer program designed to run on smartphones, phablets, tablet computers and other mobile devices.

According to embodiments of the present invention, server device 130 includes database repository 132 and user modeling program 134.

In an embodiment, database repository 132 may be storage that may be written to and/or read by user modeling program 134. In one embodiment, database repository 132 resides on server device 130. In other embodiments, database repository 132 may reside on computing device 120 or any other device (not shown) in computing environment 100, in cloud storage or on another computing device accessible via network 110. In yet another embodiment, database repository 132 may represent multiple storage devices within server device 130. Database repository 132 may be implemented using any volatile or non-volatile storage media for storing information, as known in the art. For example, database repository 132 may be implemented with a tape library, optical library, one or more independent hard disk drives, multiple hard disk drives in a redundant array of independent disks (RAID), solid-state drives (SSD), or random-access memory (RAM). Similarly, database repository 132 may be implemented with any suitable storage architecture known in the art, such as a relational database, an object-oriented database, or one or more tables. In an embodiment of the present invention, the behavioral traits of customers and products may be stored to database repository 132. Examples of data stored to database repository 132 include the names, ages, gender, hobbies, social media data of customers, the names, attributes and descriptions of products, the product traits, and the customer traits.

In embodiments of the present invention, user modeling program 134 may be a program, subprogram of a larger program, application, plurality of applications or mobile application software which functions to generate traits and match customers to products. A program is a sequence of instructions written by a programmer to perform a specific task. User modeling program 134 cannot run on itself but is dependent on system software (not shown) to execute. The system software serves the application, which in turn serves the user. In one embodiment, user modeling program 134 functions as a stand-alone program residing on server device 130. In another embodiment, user modeling program 134 may be included as a part of an operating system (not shown) of server device 130. In yet another embodiment, user modeling program 134 may work in conjunction with other programs, applications, etc., found on server device 130 or in computing environment 100. In yet another embodiment, user modeling program 134 may be found on computing device 120 or other computing devices (not shown) in computing environment 100 which are interconnected to server device 130 via network 110.

According to embodiments of the present invention, user modeling program 134 may receive a variety of inputs about a product in a group of products (e.g., a merchandise catalog of products comprising a variety of items) such as a product name, description, list of attributes, etc. and using Natural Language Processing (NLP), generates traits about that product. In a like manner, user modeling program 134 may receive inputs about a customer or a group of customers and using NLP, generates traits for the customer(s). NLP is a field of computer science, artificial intelligence, and linguistics concerned with the interactions between computers and human (natural) languages. In general, natural language processing is the ability of a computer program to understand human speech as it is spoken. In an embodiment, the customer traits may include one or more of the following: demographics (e.g., gender, age, location, marital status, level of education, employment status, place of employment, etc.), purchase history, and social media history (e.g. posting a comment or image to a forum). According to an embodiment of the present invention, user modeling program 134 then matches product traits to customer traits allowing a product seller to target potential product buyers with product recommendations. According to an embodiment of the present invention, matching between a product and a customer may be done on a best-fit basis using weighted averages of the traits of a customer and the traits of a product. The traits are weighted by percentage using the number of occurrences of each trait (e.g., normalized traits for a customer may be seventy percent active, ten percent happy, ten percent adventurous and ten percent loving) resulting in the highest percentages used as the dedicated traits for the matching process. The same process is used for weighting the product traits to further refine the most appropriate characteristics. The highest weighted customer traits are matched to the highest weighted product traits where the weight values have met a threshold (i.e., greater than thirty percent, greater than fifty percent, etc.) to be considered for matching. In an embodiment, user modeling program 134 may also enable the boosting of search results, cross-selling of similar products, and suggesting other product categories to potential buyers.

Figure 2:
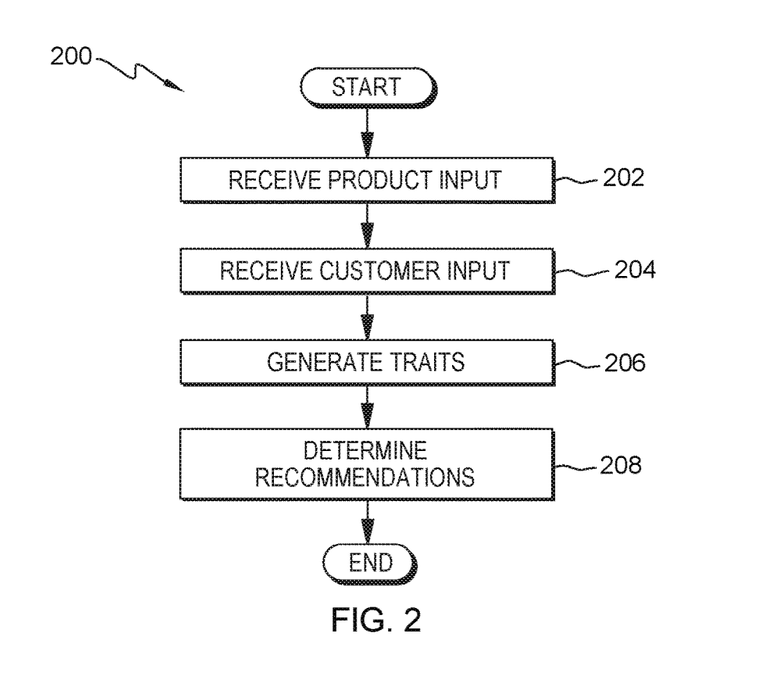
FIG. 2 is a flowchart depicting operational steps of a program that functions to generate traits and match customers to products, in accordance with an embodiment of the present invention.

FIG. 2 is a flowchart of workflow 200 representing operational steps for generating traits and matching customers to products, in accordance with an embodiment of the present invention. In one embodiment, user modeling program 134 performs the operational steps of workflow 200. In an alternative embodiment, any other program, while working with user modeling program 134, may perform the operational steps of workflow 200. In an embodiment, user modeling program 134 may invoke operational steps of workflow 200 upon the request of a user. In an alternative embodiment, user modeling program 134 may invoke operational steps of workflow 200 automatically when a product catalog is updated or when new customer segment data is available. In an embodiment, any of the operational steps of workflow 200 may be performed in any order.

In an embodiment, user modeling program 134 receives product input (step 202). In other words, user modeling program 134 receives product input such as the product name, the description of the product, the product attributes, the hierarchy of the product in the catalog, the product category description, etc. According to an embodiment of the present invention, the product input may be received from database repository 132 when queried by user modeling program 134 or on a pre-defined periodic basis (e.g., hourly, every four hours, once per day, etc.). In another embodiment, the product input may be received by user modeling program 134 whenever there is an update to a product attribute stored in database repository 132. In yet another embodiment, the product input may be provided directly to user modeling program 134 by a user of computing device 120 or server device 130. For example, a catalog manager may enter product data from a desktop computer and store the product data to a product database on a company server.

In an embodiment, user modeling program 134 receives customer input (step 204). In other words, user modeling program 134 receives customer input such as the demographics (e.g., gender, age, location, marital status, education, employment status, place of employment, etc.) of the customer, the order (i.e., purchase) history of the customer, the social media activity of the customer, etc. In an embodiment, the order history of the customer may include one or more of the following: products ordered from the same catalog, products ordered from another catalog of the same company, and when available, products ordered from a catalog of another company. An order may be made in person at a brick and mortar store, via phone, or online using any method known in the art. In an embodiment, a listing of social media activity of the customer may include one or more of the following: comments made by a customer regarding a product or products; comments made by a customer about a company; comments made by a customer about activities the customer enjoys and/or dislikes; indications of approval about a product, company, activity, or comment made by another individual; or images shared with others about a product or activity. Comments may be of unlimited length or brief (i.e., limited in length to a pre-defined number of characters). According to an embodiment of the present invention, the customer input may be received directly from known social media websites when the social media websites are monitored by user modeling program 134. In another embodiment, user modeling program 134, after monitoring known social media websites, may store the customer input to database repository 132. In yet another embodiment, the customer input may be received from database repository 132 when queried by user modeling program 134 or on a pre-defined periodic basis (e.g., hourly, every four hours, once per day, etc.). In yet another embodiment, the customer input may be received by user modeling program 134 whenever there is an update to a social media website by a customer. In yet another embodiment, the customer input may be provided directly to user modeling program 134 by a user of computing device 120 or server device 130. For example, a catalog manager may review customer activity at known social media websites and store customer input in a database for later use.

In an embodiment, user modeling program 134 generates traits (step 206). In other words, based on the received product input (step 202) and the received customer input (step 204), user modeling program 134 generates traits about the product and the customer. In an embodiment, user modeling program 134 uses NLP to generate product traits and customer traits and the resultant traits are stored to database repository 132. For example, sports equipment (e.g., a football, a canoe, a golf club, etc.) may generate an 'active' trait while tools (e.g., a cordless drill, a tape measure, a sawhorse, etc.) may generate a 'do-it-yourself or DIY' trait, which may not be a personality trait in modern psycholinguistic studies. In an embodiment, the NLP process may be customized with a psycholinguistic dictionary so that traits such as 'DIY' may be generated based on keywords. A customer who comments on a social media website about an enjoyable skiing weekend may also generate an 'active' trait while a customer who shares an image (e.g., photograph) on social media of a newly finished wood deck may also generate a 'DIY' trait. In an embodiment, object recognition may be used on an image or a video to identify objects in the image or video. Object recognition is a computer technology concerning computer vision and image processing related to detecting instances of objects. Once an object in an image is identified, NLP may generate traits on that object.

In an embodiment, user modeling program 134 determines recommendations (step 208). In other words, user modeling program 134 determines recommendations for matching products to customers by performing a process of automated mapping of catalog products to potential customers based on the generated traits of the catalog products and the customer. In an embodiment, user modeling program 134 maps the generated product traits and generated customer traits stored to database repository 132. For example, products with the 'DIY' trait are mapped to customers with the same 'DIY' trait. For the customer that shared the deck photograph, the result of this mapping is that the company may send a sale offer for a miter saw to the customer based on the 'DIY' trait for both the customer and the miter saw.

Figure 3:
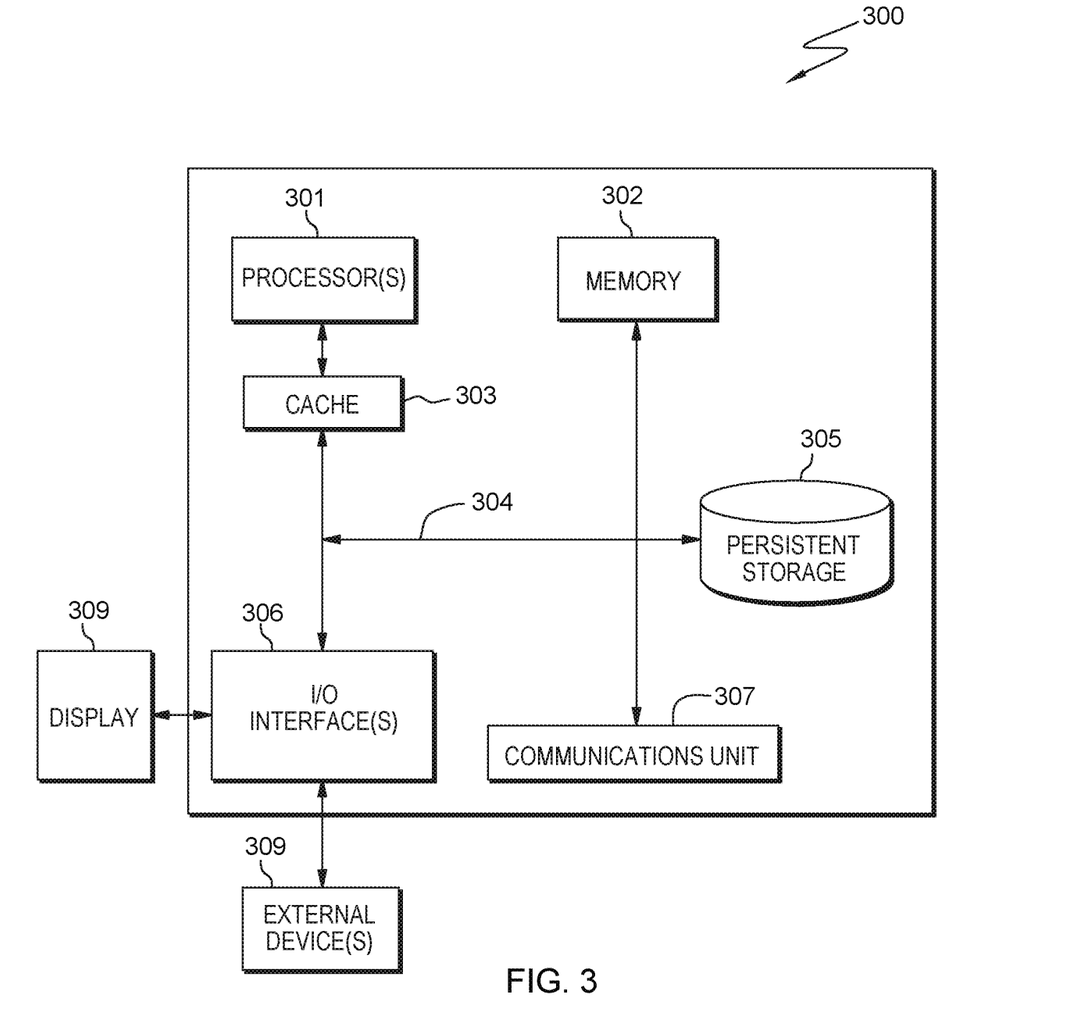
FIG. 3 depicts a block diagram of the components of the computing environment of FIG. 1, in accordance with an embodiment of the present invention.

FIG. 3 depicts computer system 300 which is an example of a system that includes user modeling program 134.

Computer system 300 includes processors 301, cache 303, memory 302, persistent storage 305, communications unit 307, input/output (I/O) interface(s) 306 and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processors 301 by holding recently accessed data, and data near recently accessed data, from memory 302.

Program instructions and data used to practice embodiments of the present invention may be stored in persistent storage 305 and in memory 302 for execution by one or more of the respective processors 301 via cache 303. In an embodiment, persistent storage 305 includes a magnetic hard disk drive. Alternatively, or in addition to a magnetic hard disk drive, persistent storage 305 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data used to practice embodiments of the present invention may be downloaded to persistent storage 305 through communications unit 307.

I/O interface(s) 306 allows for input and output of data with other devices that may be connected to each computer system. For example, I/O interface 306 may provide a connection to external devices 308 such as a keyboard, keypad, a touch screen, and/or some other suitable input device. External devices 308 can also include portable computer readable storage media such as, for example, thumb drives, portable optical or magnetic disks, and memory cards. Software and data used to practice embodiments of the present invention can be stored on such portable computer readable storage media and can be loaded onto persistent storage 305 via I/O interface(s) 306. I/O interface(s) 306 also connect to display 309.

Display 309 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   receiving, by one or more computer processors, details for a product in a-merchandise catalog of products, the details comprising a product name, a hierarchy of the product in the merchandise catalog, a product description and a list of attributes;
   receiving, by one or more computer processors, input for a customer, the input comprising a purchase history of products ordered from the merchandise catalog of products;
   storing, by one or more computer processors, the details for the product and the input for the customer to a database repository;
   generating, by one or more computer processors, product traits automatically as the merchandise catalog of products is updated using Natural Language Processing to perform a linguistic analysis to infer product traits relating to the product;
   generating, by one or more computer processors, customer traits using the Natural Language Processing to perform a second linguistic analysis of the purchase history of products to infer personality traits of the customer, independently from generating the product traits;
   automated mapping, by one or more computer processors, the customer to products within the database repository by mapping product traits stored by the database repository to each identically matching customer trait stored by the database repository; and
   outputting, by one or more computer processors, a recommendation for a second product of the merchandise catalog of products based on the mapping of the product traits to the identically matching customer traits of the customer.

2. The method of claim 1, wherein the input for the customer further includes demographics selected from the group consisting of a location, an employment status, and a place of employment.

3. The method of claim 1, wherein the product traits and the customer traits are generated using Natural Language Processing by a Linguistic Inquiry and a Word Count psycholinguistic dictionary to identify words associated with psychologically-relevant categories.

4. The method of claim 1, wherein the step of outputting the recommendation comprises:
   determining a weighted average for the product traits and a weighted average for customer traits, wherein the weighted average comprises at least one product trait or at least one customer trait weighted by a number of occurrences of the at least one product trait or the at least one customer trait normalized as a percentage of all of the product traits or all of the customer traits; and
   matching a list of highest weighted product traits to a list of highest weighted customer traits based on a best-fit basis of the weighted averages.

5. The method of claim 1, wherein the input for the customer further includes demographics comprising social media activity and the social media activity comprises providing an image or video to a social media website.

6. The method of claim 5, further comprising wherein the Natural Language Processing using object recognition of the image or video from the social media activity to generate customer traits.

7. A computer program product, the computer program product comprising:
one or more computer readable storage media; and
program instructions stored on the one or more computer readable storage media, the program instructions executing a computer-implemented method comprising:
receiving, by one or more computer processors, details for a product in a merchandise catalog of products, the details comprising a product name, a hierarchy of the product in the merchandise catalog, product description and a list of attributes;
receiving, by one or more computer processors, input for a customer, the input comprising a purchase history of products ordered from the merchandise catalog of products;
storing, by one or more computer processors, the details for the product and the input for the customer to a database repository;
generating, by one or more computer processors, product traits automatically as the merchandise catalog of products is updated using Natural Language Processing to perform a linguistic analysis to infer product traits relating to the product;
generating, by one or more computer processors, customer traits using the Natural Language Processing to perform a second linguistic analysis of the purchase history of products to infer personality traits of the customer, independently from generating the product traits;
automated mapping, by one or more computer processors, the customer to products within the database repository by mapping product traits stored by the database repository to each identically matching customer trait stored by the database repository; and
outputting, by one or more computer processors, a recommendation for a second product of the merchandise catalog of products based on the mapping of the product traits to the identically matching customer traits of the customer.

8. The computer program product of claim 7, wherein the input for the customer further includes demographics selected from the group consisting of a location, an employment status, and a place of employment.

9. The computer program product of claim 7, wherein the product traits and the customer traits are generated using Natural Language Processing by a Linguistic Inquiry and a Word Count psycholinguistic dictionary to identify words associated with psychologically-relevant categories.

10. The computer program product of claim 7, wherein the step of outputting the recommendation comprises:
determining a weighted average for the product traits and a weighted average for customer traits, wherein the weighted average comprises at least one product trait or at least one customer trait weighted by a number of occurrences of the at least one product trait or the at least one customer trait normalized as a percentage of all of the product traits or all of the customer traits; and
matching a list of highest weighted product traits to a list of highest weighted customer traits based on a best-fit basis of the weighted averages.

11. The computer program product of claim 7, wherein the input for the customer further includes demographics comprising social media activity and the social media activity comprises providing an image or video to a social media website.

12. The computer program product of claim 11 further comprising wherein the Natural Language Processing is using object recognition of the image or video from the social media activity to generate customer traits.

13. A computer system comprising:
at least one processor; and
a computer-readable storage media coupled to the at least one processor, wherein the computer-readable storage media contains program instructions executing a computer-implemented method comprising:
receiving, by one or more computer processors, details for a product in a merchandise catalog of products, the details comprising a product name, a hierarchy of the product in the merchandise catalog, product description and a list of attributes;
receiving, by one or more computer processors, input for a customer, the input comprising a purchase history of products ordered from the merchandise catalog of products;
storing, by one or more computer processors, the details for the product and the input for the customer to a database repository;
generating, by one or more computer processors, product traits automatically as the merchandise catalog of products is updated using Natural Language Processing to perform a linguistic analysis to infer product traits relating to the product;
generating, by one or more computer processors, customer traits using the Natural Language Processing to perform a second linguistic analysis of the purchase history of products to infer personality traits of the customer, independently from generating the product traits;
automated mapping, by one or more computer processors, the customer to products within the database repository by mapping product traits stored by the database repository to each identically matching customer trait stored by the database repository; and
outputting, by one or more computer processors, a recommendation for a second product of the merchandise catalog of products based on the mapping of the product traits to the identically matching customer traits of the customer.

14. The computer system of claim 13, wherein the input for the customer further includes demographics selected from the group consisting of a location, an employment status, and a place of employment.

15. The computer system of claim 13, wherein the product traits and the customer traits are generated using Natural Language Processing by a Linguistic Inquiry and a Word Count psycholinguistic dictionary to identify words associated with psychologically-relevant categories.

16. The computer system of claim 13, wherein the step of outputting the recommendation comprises:
determining a weighted average for the product traits and a weighted average for customer traits, wherein the weighted average comprises at least one product trait or at least one customer trait weighted by a number of occurrences of the at least one product trait or the at least one customer trait normalized as a percentage of all of the product traits or all of the customer traits; and
matching a list of highest weighted product traits to a list of highest weighted customer traits based on a best-fit basis of the weighted averages.

17. The computer system of claim 13, wherein the input for the customer further includes demographics comprising social media activity and the social media activity comprises providing an image or video to a social media website.

18. The computer system of claim 17, further comprising wherein the Natural Language Processing is using object recognition of the image or video from the social media activity to generate customer traits.

\* \* \* \* \*